United States Patent
Drerup et al.

(10) Patent No.: US 7,575,415 B2
(45) Date of Patent: Aug. 18, 2009

(54) METHODS AND APPARATUS FOR ASSEMBLING TURBINE ENGINES

(75) Inventors: Vincent Marion Drerup, Cincinnati, OH (US); Harold Ray Hansel, Mason, OH (US); James Anthony Ketzer, Cincinnati, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 11/271,101

(22) Filed: Nov. 10, 2005

(65) Prior Publication Data
US 2007/0104571 A1 May 10, 2007

(51) Int. Cl.
*F01D 9/04* (2006.01)
(52) U.S. Cl. .................. 415/135; 415/138; 415/139; 29/888.3; 29/889.2; 29/889.22
(58) Field of Classification Search .......... 415/135, 415/136, 138, 139, 191; 277/303, 311; 29/888.3, 29/889.2, 889.22
See application file for complete search history.

(56) References Cited

U.S. PATENT DOCUMENTS

| | | | | |
|---|---|---|---|---|
| 3,393,894 A | * | 7/1968 | Redsell | 416/47 |
| 3,728,041 A | * | 4/1973 | Bertelson | 415/139 |
| 3,947,145 A | * | 3/1976 | Michel et al. | 415/209.4 |
| 4,524,980 A | * | 6/1985 | Lillibridge et al. | 277/641 |
| 5,074,748 A | | 12/1991 | Hagle | |
| 5,154,577 A | * | 10/1992 | Kellock et al. | 415/170.1 |
| 5,249,920 A | * | 10/1993 | Shepherd et al. | 415/135 |
| 5,655,876 A | | 8/1997 | Rock et al. | |
| 6,254,333 B1 | * | 7/2001 | Merry | 415/139 |
| 2006/0263204 A1 | * | 11/2006 | London et al. | 415/135 |

FOREIGN PATENT DOCUMENTS

WO   WO 2004/074640 A1 *   9/2004

\* cited by examiner

*Primary Examiner*—Christopher Verdier
(74) *Attorney, Agent, or Firm*—William Scott Andes, Esq.; Armstrong Teasdale LLP

(57) ABSTRACT

A method for assembling a gas turbine engine is provided. The method comprises coupling a first turbine nozzle within the engine, coupling a second turbine nozzle circumferentially adjacent the first turbine nozzle such that a gap is defined between the first and second turbine nozzles and providing at least one spline seal including a substantially planar body. The method also comprises forming at least one retainer tab to extend outward from the body portion of the at least one spline seal, and inserting the at least one spline seal into a slot defined in at least one of the first and second turbine nozzles to facilitate reducing leakage through the gap, such that the at least one retainer tab facilitates retaining the retainer tab within the turbine nozzle slot.

15 Claims, 4 Drawing Sheets

METHODS AND APPARATUS FOR ASSEMBLING TURBINE ENGINES

BACKGROUND OF THE INVENTION

This invention relates generally to turbine engines and more particularly, to methods and apparatus for assembling gas turbine engines.

Known gas turbine engines include combustors which ignite fuel-air mixtures which are then channeled through a turbine nozzle assembly towards a turbine. At least some known turbine nozzle assemblies include a plurality of arcuate nozzle segments arranged circumferentially. At least some known turbine nozzles include a plurality of circumferentially-spaced hollow airfoil vanes coupled by integrally-formed inner and outer band platforms. More specifically, the inner band forms a portion of the radially inner flowpath boundary and the outer band forms a portion of the radially outer flowpath boundary.

Within known turbine nozzle assemblies, the turbine nozzle segments are coupled circumferentially within the turbine engine. More specifically, because of temperature differentials that may develop and to accommodate thermal expansion, known turbine nozzles are positioned such that a gap or clearance is defined between pairs of circumferentially-adjacent nozzles. To facilitate preventing cooling air supplied to such nozzle segments from leaking through the clearance gaps, at least some known turbine nozzle assemblies include a plurality of spline seals.

Known spline seals are substantially flat pieces of material that are inserted within slots defined in the turbine nozzles. More specifically, at least some known nozzle assemblies include a loading slot that facilitates the installation of the spline seals within the spline seal slots. However, depending on the operation of the turbine engine, at least some known spline seals may undesirably slip out of the spline seal slots through the loading slot. Such seals may be channeled downstream and cause damage to other engine components. Moreover, over time, continued operation with decreased cooling of the turbine nozzles adjacent such spline seal slots may limit a useful life of the turbine nozzle.

BRIEF SUMMARY OF THE INVENTION

In one aspect, a method for assembling a gas turbine engine is provided. The method comprises coupling a first turbine nozzle within the engine, coupling a second turbine nozzle circumferentially adjacent the first turbine nozzle such that a gap is defined between the first and second turbine nozzles and providing at least one spline seal including a substantially planar body. The method also comprises forming at least one retainer tab to extend outward from the body portion of the at least one spline seal, and inserting the at least one spline seal into a slot defined in at least one of the first and second turbine nozzles to facilitate reducing leakage through said gap, such that the at least one retainer tab facilitates retaining the retainer tab within the turbine nozzle slot.

In another aspect, a seal assembly for use with a turbine engine turbine nozzle assembly is provided. The seal assembly includes at least one spline seal sized for insertion within a slot formed within a turbine nozzle. The at least one spline seal is configured to facilitate reducing leakage through the turbine engine turbine nozzle assembly, and includes a substantially planar body and at least one tab extending outward from said body. The seal body is bounded by an outer periphery, and the at least one tab is adjacent to the body outer periphery.

In a further aspect, a turbine nozzle assembly for a gas turbine engine is provided. The nozzle assembly includes a plurality of turbine nozzles and a seal assembly. Each turbine nozzle includes an outer band, an inner band, and at least one airfoil vane extending between the outer and inner bands. A portion of each of the plurality of turbine nozzles defines a slot therein. The seal assembly includes at least one spline seal sized for insertion within the turbine nozzle slot to facilitate reducing leakage between circumferentially adjacent pairs of the turbine nozzles. The at least one spline seal includes a substantially planar body and at least one retainer tab extending outward from the body. The body is bounded by an outer periphery, and the at least one retainer tab is adjacent to the body outer periphery.

DETAILED DESCRIPTION OF THE INVENTION

Figure 1:
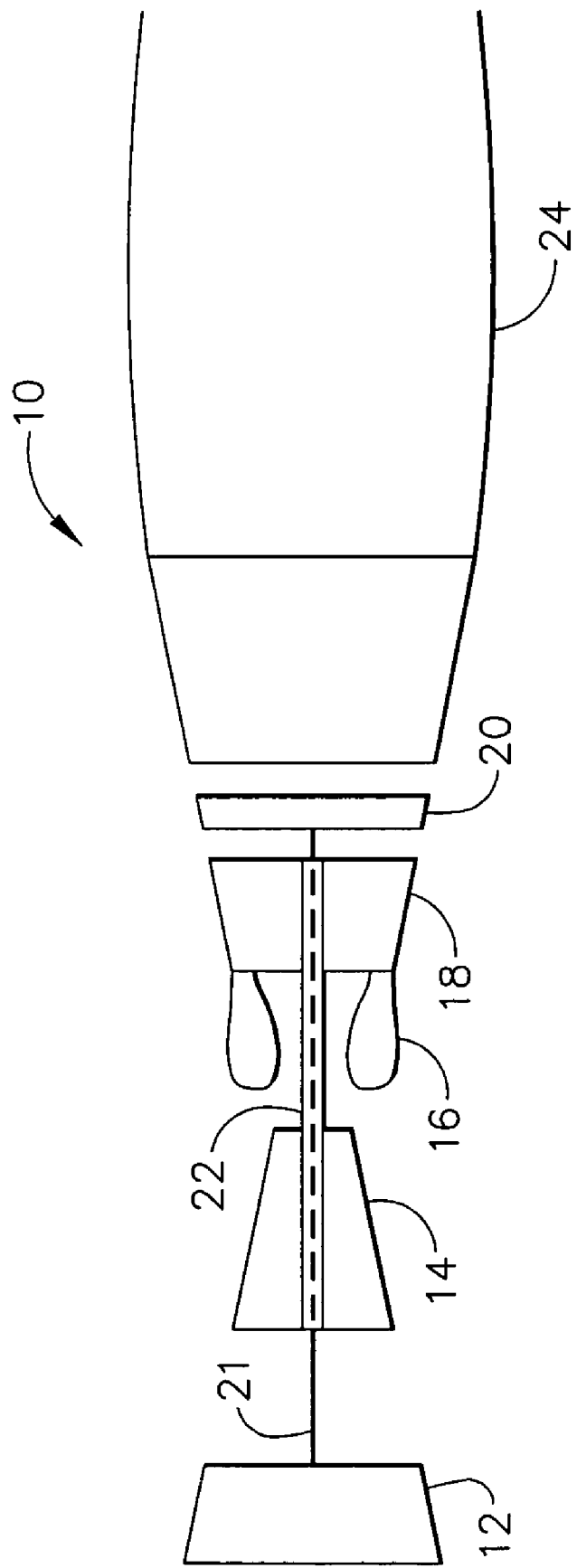
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle (not shown in FIG. 1) to drive turbines 18 and 20, prior to exiting gas turbine engine 10 through an exhaust nozzle 24.

Figure 2:
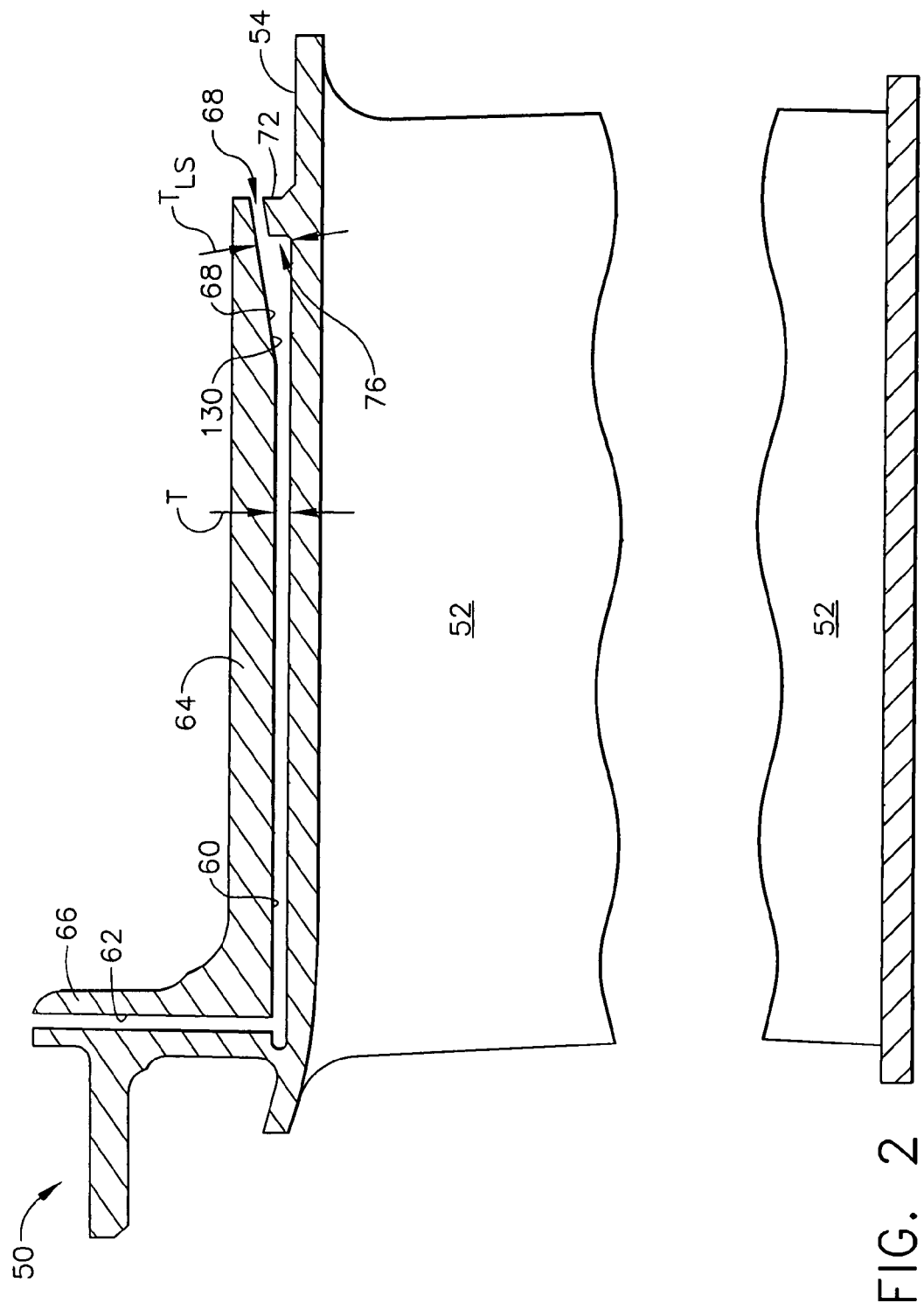
FIG. 2 is a side view of an exemplary turbine nozzle that may be used with the gas turbine engine shown in FIG. 1.

FIG. 2 is a side view of an exemplary turbine nozzle 50 that may be used with a gas turbine engine, such as turbine engine 10 (shown in FIG. 1). In the exemplary embodiment, nozzle 50 is one segment of a plurality of segments that are positioned circumferentially to form a nozzle assembly (not shown) within the gas turbine engine. Nozzle 50 includes at least one airfoil vane 52 extending between an arcuate radially outer band or platform 54, and an arcuate radially inner band or platform (shown in FIG. 2). More specifically, in the exemplary embodiment, outer band 54 and the inner band are each integrally-formed with airfoil vane 52.

In the exemplary embodiment, nozzle 50 also includes an axial spline seal slot 60 and a radial spline seal slot 62 that are each formed in a generally axially-extending face 64 of nozzle 50. More specifically, slot 60 extends generally axially through a portion of face 64 and slot 62 extends generally radially through a radial flange 66 portion of nozzle 50. In the exemplary embodiment, slot 60 is also formed integrally with a loading slot portion 68 that facilitates the installation of axial spline seals (not shown in FIG. 2) into the segmented nozzle assembly.

A thickness T of spline seal slot 60 is substantially constant through slot 60. In the exemplary embodiment, loading slot portion 68 is frusto-conical such that a thickness $T_{LS}$ of slot portion 68 increases from slot 60 to a stop projection 72 adjacent a trailing end 76 of slot portion 68. Stop projection 72 facilitates maintaining the spline seal within slot 60.

During assembly of the nozzle assembly, a plurality of nozzles 50 are positioned circumferentially adjacent to each other to form the nozzle assembly. Specifically, nozzles 50 are positioned relative to each other such that a clearance gap is defined between each pair of circumferentially adjacent pairs of nozzles. More specifically, the clearance gap is defined between circumferentially adjacent and opposing nozzle end faces 64. To facilitate sealing the clearance gaps, spline seals (not shown in FIG. 2) are inserted within a pair of circumferentially adjacent spline seal slots 60. More specifically, when positioned within slots 60, each spline seal circumferentially bridges the clearance gap to facilitate preventing leakage through the gap.

Figure 3:
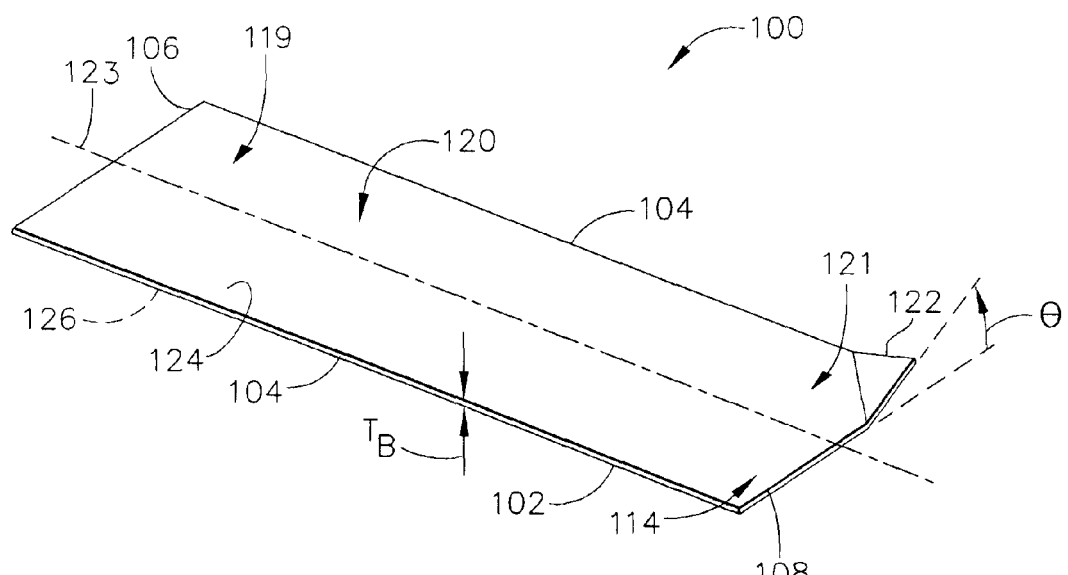
FIG. 3 is a perspective view of an exemplary spline seal that may be used with the turbine nozzle shown in FIG. 2.

FIG. 3 is a perspective view of an exemplary spline seal 100 that may be used in turbine nozzle 50 (shown in FIG. 2). In the exemplary embodiment, spline seal 100 is substantially rectangular and is bordered by an outer perimeter 102 including a pair of circumferentially-spaced sides 104 that are connected by a leading edge side 106 and a trailing edge side 108. Alternatively, spline seal 100 may have any non-rectangular shape that enables seal 100 to function as described herein. Accordingly, in the exemplary embodiment, at least one corner portion 114 is defined at the intersection of sides 104 and 106 or sides 104 and 108. Moreover, spline seal 100 includes at least one area defined at least partially by at least one corner portion 114.

Spline seal 100 includes a body portion 120 and a retainer tab 122. Body portion 120 is substantially planar and includes a radially outer surface 124 and an opposite radially inner surface 126. Body portion 120 is sized for insertion within spline seal slot 60 and has a thickness TB that is thinner than spline seal slot thickness T. As shown in FIGS. 3-6, spline seal 100 includes a first end 119 and a second end 121 extending from opposing ends of body portion 120. More specifically, first end 119 opposes second end 121 along a longitudinal axis 123 of spline seal 100 and body portion 120. First end 119 is substantially planar with body portion 120. First end 119 is partially defined by leading edge side 106, and second end 121 is partially defined by trailing edge side 108. Portions of each side 104 define side edges of first end 119 and second end 121. As such, first end 106 includes two corner portions 114, and second end 121 includes two corner portions 114. Outer perimeter 102 circumscribes first end 119 and body portion 120. In the embodiments shown in FIGS. 3 and 5, outer perimeter 102 also circumscribes second end 121. In one embodiment, spline seal 100 is fabricated from a substantially flat piece of sheet metal.

Figure 5:
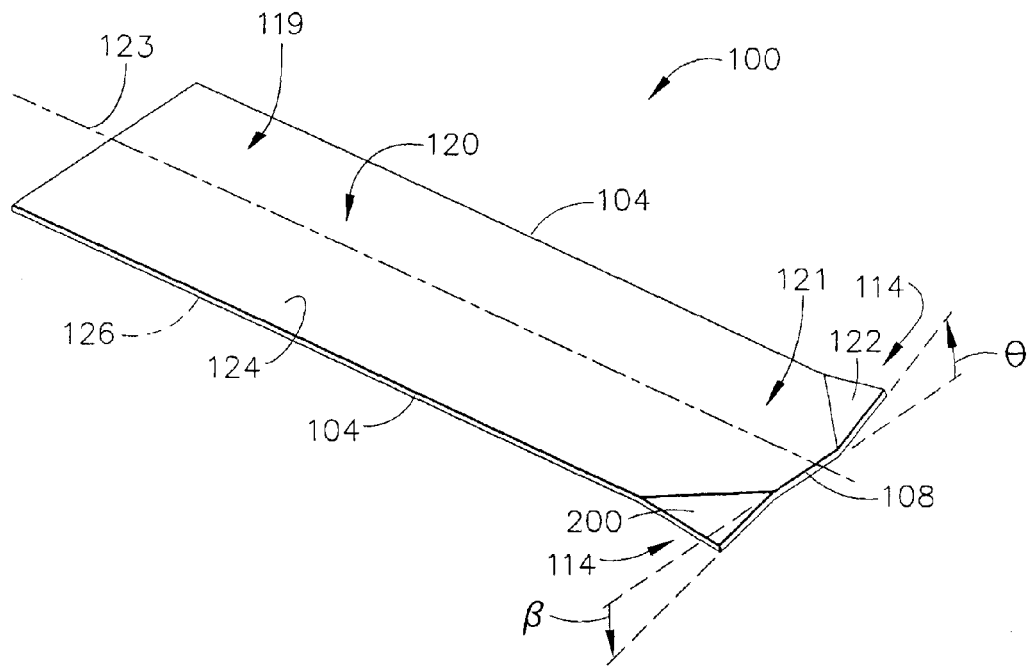
FIG. 5 is perspective view of a further alternative embodiment of the spline seal shown in FIG. 3.

Referring to FIG. 3, second end 121 includes retainer tab 122 such that retainer tab 122 extends outward from body portion 120. Retainer tab 122 is not co-planar with body portion 120, although a portion of second end 121 not including retainer tab 122 may be substantially co-planar with body portion 120, as shown in FIGS. 3 and 5. Specifically, in the exemplary embodiment shown in FIG. 3, retainer tab 122 extends outward from spline seal outer perimeter 102, and more specifically, is formed within a spline seal corner portion 114. Accordingly, in the exemplary embodiment, retainer tab 122 is substantially triangular shaped. Alternatively, retainer tab 122 may be formed in any portion of body portion 120, or have any shape, that enables retainer tab 122 to function as described herein. Moreover, although only one retainer tab 122 is illustrated, spline seal 100 may include any number of retainer tabs 122. In the exemplary embodiment, retainer tab 122 is oriented at an oblique angle θ with respect to body radially outer surface 124. Alternatively, retainer tab 122 may be oriented at any angle θ with respect to radially outer surface 124 that enables retainer tab 122 to function as described herein. In another alternative embodiment, retainer tab 122 may be oriented at any angle θ with respect to body radially inner surface 126 such that retainer tab 122 extends radially inward from surface 126 rather than outward from surface 124.

In the exemplary embodiment retainer tab 122 is formed integrally with second end 121, which is formed integrally with body portion 120. More specifically, in the exemplary embodiment, retainer tab 122 is formed by bending a portion of spline seal 100 to a desired angle θ. Alternatively, retainer tab 122 may be coupled to body portion 120.

During assembly, spline seal 100 is inserted through loading slot portion 68 and into spline seal slot 60 such that spline seal 100 circumferentially bridges the clearance gap between adjacent nozzles 50 (shown in FIG. 2). More specifically, spline seal 100 is inserted into slot 60 such that seal leading edge side 106 is upstream from seal trailing edge side 108. As such, in the exemplary embodiment, when spline seal 100 is fully inserted into slot 60, retainer tab 122 extends outward from spline seal body portion 120 and contacts a radially upper surface 130 (shown in FIG. 2) of slot portion 68, which limits the amount of radial movement of trailing edge side 108. Moreover, because the radial movement of spline seal side 108 is limited, spline seal trailing edge side 108 is facilitated to be maintained in contact with, or in position to contact, stop projection 72. As such, during engine operation, retainer tab 122 facilitates maintaining spline seal 100 within spline seal slot 60, and thus facilitates preventing spline seal 100 from undesirably slipping or backing out from slot 60. As a result, retainer tab 122 facilitates minimizing leakage through the segmented turbine nozzle assembly clearance gaps and thus facilitates enhancing engine performance and component life expectancy.

Figure 4:
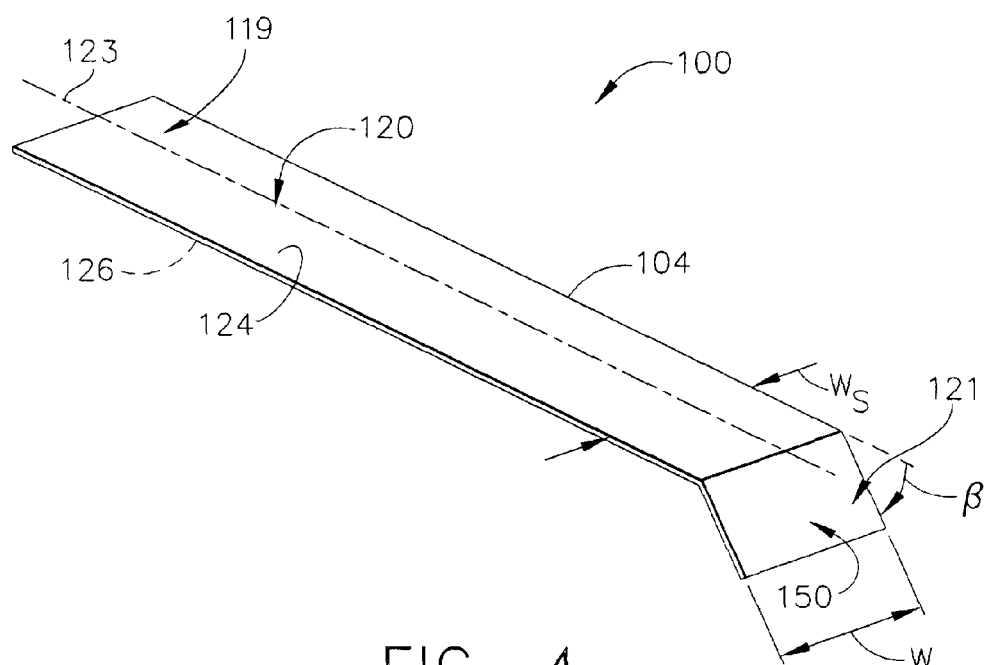
FIG. 4 is a perspective view of an alternative embodiment of the spline seal shown in FIG. 3.

FIG. 4 is a perspective view of an alternative embodiment of spline seal 100. The embodiment illustrated in FIG. 4 is substantially similar to the embodiment illustrated in FIG. 3 and components of spline seal 100 illustrated in FIG. 4 that are identical to components of spline seal 100 illustrated in FIG. 3, are identified in FIG. 4 using the same reference numerals used in FIG. 3. Accordingly, spline seal second end 121 includes a retainer tab 150 such that retainer tab 150 extends outward from body portion 120. Retainer tab 150 is not co-planar with body portion 120. Specifically, in the exemplary embodiment, retainer tab 150 has a width W that is identical to a width Ws of spline seal 100 measured between sides 104. Accordingly, in the exemplary embodiment, retainer tab 150 is substantially rectangular-shaped. Alternatively, retainer tab 150 may extend from any portion of body portion 120, or have any shape, that enables retainer tab 150 to function as described herein. In the exemplary embodiment, retainer tab 150 is oriented at an oblique angle β with respect to body radially inner surface 126. Alternatively, retainer tab 150 may be oriented at any angle β with respect to radially inner surface 126 that enables retainer tab 150 to function as described herein.

In the exemplary embodiment retainer tab 150 is formed integrally with second end 121, which is formed integrally with body portion 120. More specifically, in the exemplary embodiment, retainer tab 150 is formed by bending a portion of spline seal 100 to a desired angle β. Alternatively, retainer tab 150 may be coupled to body portion 120.

During engine operation, when spline seal 100 is fully inserted into slot 60, because retainer tab 150 extends outward from spline seal body portion 120, retainer tab 150 facilitates limiting an amount of radial and axial movement of spline seal 100. More specifically, as spline seal 100 travels afterward towards loading slot portion 68, retainer tab 150 contacts stop projection 72. As such, during engine operation, retainer tab 150 facilitates maintaining spline seal 100 within spline seal slot 60, and thus facilitates preventing spline seal 100 from undesirably slipping or backing out from slot 60. As a result, retainer tab 150 facilitates minimizing leakage through the segmented turbine nozzle assembly clearance gaps and thus facilitates enhancing engine performance and component life expectancy.

FIG. 5 is perspective view of a further alternative embodiment of spline seal 100. The embodiment illustrated in FIG. 5 is substantially similar to the embodiment illustrated in FIG. 3 and components of spline seal 100 illustrated in FIG. 5 that are identical to components of spline seal 100 illustrated in FIG. 3, are identified in FIG. 5 using the same reference numerals used in FIG. 3. Accordingly, spline seal 100 includes second end 121 having retainer tab 122 and body portion 120. Second end 121 also includes a second retainer tab 200 such that second retainer tab 200 extends outward from body portion 120. Second retainer tab 200 is not co-planar with body portion 120. Specifically, in the exemplary embodiment, retainer tab 200 extends outward from spline seal outer perimeter 102, and more specifically, is formed within second end 121's other spline seal corner portion 114. Accordingly, in the exemplary embodiment, retainer tab 200 is substantially triangular shaped. Alternatively, retainer tab 200 may be formed in any portion of body portion 120, or have any shape, that enables retainer tab 200 to function as described herein.

In the exemplary embodiment, retainer tab 200 is oriented at an oblique angle β with respect to body radially inner surface 126. Alternatively, retainer tab 200 may be oriented at any angle β with respect to radially inner surface 126 that enables retainer tab 200 to function as described herein.

In the exemplary embodiment, retainer tab 200 is formed integrally with second end 121, which is formed integrally with body portion 120. More specifically, in the exemplary embodiment, retainer tab 200 is formed by bending a portion of spline seal 100 to a desired angle β. Alternatively, retainer tab 200 may be coupled to body portion 120.

Figure 6:
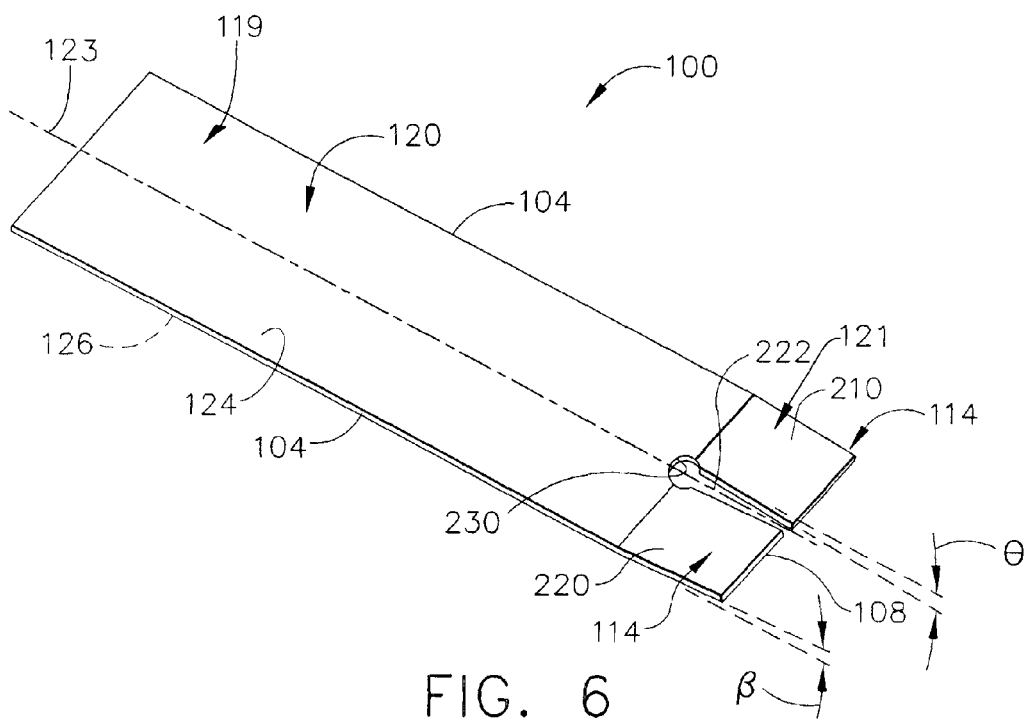
FIG. 6 is a perspective view of another alternative embodiment of the spline seal shown in FIG. 3.

FIG. 6 is a perspective view of another alternative embodiment of spline seal 100. The embodiment illustrated in FIG. 6 is substantially similar to the embodiment illustrated in FIG. 3 and components of spline seal 100 illustrated in FIG. 6 that are identical to components of spline seal 100 illustrated in FIG. 3, are identified in FIG. 6 using the same reference numerals used in FIG. 3. Accordingly, spline seal 100 includes body portion 120 and second end 121 that includes a first retainer tab 210 and a second retainer tab 220. Specifically, in the exemplary embodiment, each retainer tab 210 and 220 extends outward from spline seal outer perimeter 102, and each is formed partially within each spline seal corner portion 114 of second end 121. More specifically, in the exemplary embodiment, spline seal 100 includes a retainer division slot or cut 222 that extends a distance axially upstream from spline seal trailing edge side 108. In the exemplary embodiment, slot 222 is substantially centered between spline seal sides 104, such that retainer tabs 210 and 220 are approximately the same size. Alternatively, slot 222 is non-centered with respect to spline seal 100 and retainer tabs 210 and 220 have different sizes. Accordingly, in the exemplary embodiment, retainer tabs 210 and 220 are each substantially rectangular-shaped.

Slot 222 extends from spline seal trailing edge 108 to a relief stop hole 230 extending through spline seal 100. Stop hole 230 facilitates reducing stresses that may be induced to spline seal 100 adjacent retainer tabs 210 and 220 and also facilitates preventing the initiation or propagation of cracks that may develop within spline seal 100 between retainer tabs 210 and 220.

In the exemplary embodiment, retainer tab 210 is oriented at an oblique angle θ with respect to body radially outer surface 124, and retainer tab 220 is oriented at an oblique angle β with respect to body radially inner surface 126. Alternatively, retainer tabs 210 and 220 may be oriented at any angles θ or β with respect to radially outer and inner surfaces 124 and 126, respectively, that enables retainer tabs 210 and 220 to function as described herein. As such, retainer tabs 210 and 220 are non-planar with respect to body portion 120.

In the exemplary embodiment, retainer tabs 210 and 220 are each formed integrally with second end 121, which is formed integrally with body portion 120. More specifically, in the exemplary embodiment retainer tabs 210 and 220 are each formed by bending a portion of spline seal 100 that is adjacent to slot 222 to a respective desired angle θ or β. Alternatively, either retainer tab 210 and/or retainer tab 220 may be coupled to body portion 120.

In each embodiment, the above-described spline seals include a retainer tab that facilitates preventing the spline seal from inadvertently backing out of the nozzle assembly spline seal slots. More specifically, in each embodiment, the retainer tab extends outward from the body portion of the spline seal to facilitate limiting radial and movement of the spline seal within the spline seal slot. As a result, during engine operation, the retainer tabs facilitate reducing leakage through the clearance gap defined between circumferentially adjacent turbine nozzles. Accordingly, engine performance and component useful life are each facilitated to be enhanced in a cost effective and reliable means. Moreover, the invention provides a means wherein existing spline seals can be modified to facilitate enhancing turbine engine performance.

Exemplary embodiments of turbine nozzles are described above in detail. The spline seals are not limited to use with the specific nozzle embodiments described herein, but rather, the spline seals can be utilized independently and separately from other turbine nozzle components described herein. Moreover, the invention is not limited to the embodiments of the spline seals described above in detail. Rather, other variations of spline embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   coupling a first turbine nozzle within the engine;
   coupling a second turbine nozzle circumferentially adjacent the first turbine nozzle such that a gap is defined between the first and second turbine nozzles;

providing at least one spline seal including a substantially planar body and at least one retainer tab that extends outward from the body and that is formed integrally with the body; and inserting the at least one spline seal into a slot defined in at least one of the first and second turbine nozzles to facilitate reducing leakage through said gap, a stop projection is defined within the slot, such that the at least one retainer tab and the stop projection facilitate retaining the at least one spline seal within the turbine nozzle slot.

2. A method in accordance with claim 1 wherein the at least one spline seal includes at least one area defined at least partially by a corner, said forming at least one retainer tab further comprises forming the retainer tab within the area of the spline seal body defined by the corner.

3. A method in accordance with claim 1 wherein forming at least one retainer tab further comprises forming a slot within the at least one spline seal body adjacent the retainer tab.

4. A method in accordance with claim 1 wherein forming at least one retainer tab further comprises forming the retainer tab to have a width that is substantially equal to a width of the at least one spline seal body.

5. A method in accordance with claim 1 wherein forming at least one retainer tab further comprises:

forming a first retainer tab to extend outward from a first side of the at least one spline seal body; and forming a second retainer tab to extend outward from an opposite second side of the at least one spline seal body.

6. A seal assembly for use with a turbine engine turbine nozzle assembly, said seal assembly comprising:

at least one spline seal sized for insertion within a slot formed within a turbine nozzle, said at least one spline seal configured to facilitate reducing leakage through the turbine engine turbine nozzle assembly, said at least one spline seal comprising:

a substantially planar body extending between a first end edge and a second end edge, said first end edge being substantially co-planar with said body, and at least a portion of said second end being non-planar with said body;

a first tab extending outward from said body in a first angular direction, said first tab at least partially defined by said portion of said second end edge that is non-planar with said body; and a second tab extending outward from said body in a second annular direction.

7. A seal assembly in accordance with claim 6 wherein said body further comprises a slot defined therein, said slot adjacent to at least one of said first tab and said second tab.

8. A seal assembly in accordance with claim 6 wherein at least one of said first tab and said second tab is configured to facilitate maintaining said spline seal within said turbine nozzle slot.

9. A turbine nozzle assembly for a gas turbine engine, said nozzle assembly comprising:

a plurality of turbine nozzles each comprising an outer band, an inner band, and at least one airfoil vane coupled together by said outer and inner bands, a portion of each of said plurality of turbine nozzles defines a slot therein, a stop projection is defined within said turbine nozzle slot; and a seal assembly comprising at least one spline seal sized for insertion within said turbine nozzle slot to facilitate reducing leakage between circumferentially adjacent pairs of said turbine nozzles, said at least one spline seal comprising a substantially planar body and at least one retainer tab extending outward from said body, said spline seal body is formed integrally with said at least one retainer tab, said body bounded by an outer periphery, said at least one retainer tab adjacent to said body outer periphery, said at least one retainer tab and said stop projection facilitate retaining said at least one spline seal within said turbine nozzle slot.

10. A turbine nozzle assembly in accordance with claim 9 wherein said at least one spline seal body is formed integrally with said at least one retainer tab such that said at least one retainer tab extends obliquely from said body.

11. A turbine nozzle assembly in accordance with claim 9 wherein said at least one spline seal body comprises at least two corner areas, at least one of said two corner areas extends integrally outward from said body to form said at least one retainer tab.

12. A turbine nozzle assembly in accordance with claim 9 wherein said at least one spline seal body further comprises a slot defined therein adjacent to said at least one retainer tab.

13. A turbine nozzle assembly in accordance with claim 9 wherein said at least one retainer tab facilitates maintaining said at least one spline seal within said turbine nozzle slot.

14. A turbine nozzle assembly in accordance with claim 9 wherein said at least one retainer tab has a width that is substantially equal to a width of said at least one spline seal.

15. A turbine nozzle assembly in accordance wit claim 9 wherein said at least one retainer tab facilitates maintaining said seal assembly within said turbine nozzle slot.

* * * * *